United States Patent [19]
Powers et al.

[11] Patent Number: 5,104,348
[45] Date of Patent: Apr. 14, 1992

[54] SIZER APPARATUS HAVING SHIFTABLE HORN

[75] Inventors: Richard G. Powers, Overland Park, Kans.; Harrison A. Ailey, Jr., Knoxville, Tenn.; James E. Anderson, Prairie Village, Kans.

[73] Assignee: Marlen Research Corporation, Overland Park, Kans.

[21] Appl. No.: 773,032

[22] Filed: Oct. 8, 1991

[51] Int. Cl.⁵ ............................................... A22C 11/02
[52] U.S. Cl. ........................................... 452/45; 452/37
[58] Field of Search ..................... 452/37, 30, 22, 35, 452/45

[56] References Cited

U.S. PATENT DOCUMENTS

| | | | |
|---|---|---|---|
| 3,731,346 | 5/1973 | Kupcikeuicius | 452/45 |
| 3,885,053 | 5/1975 | Townsend | 450/35 |
| 3,975,795 | 8/1976 | Kupcikeuicius | 452/45 |
| 4,044,426 | 8/1977 | Kupcikevicius et al. | 452/37 |
| 4,447,933 | 5/1984 | Spiegelberg | 452/45 |

*Primary Examiner*—Willis Little
*Attorney, Agent, or Firm*—Hovey, Williams, Timmons & Collins

[57] ABSTRACT

A preferred sizer (10) for stuffing flowable materials such as sausage into a flexible casing (24) includes a horn assembly (12) having inner and outer concentric tube (28, 34) presenting an evacuation chamber (46) therebetween connected to a vacuum source (50a) for deaerating material within the inner tube (34). The tubes (28, 34) are shiftable relative to one another between an open position in which the chamber (46) communicates with the interior of the inner tube (34) through an open space (48) adjacent the discharge ends (30, 36) of the tubes (28, 34) for evacuating air from material within the inner tube (34), and a closed position in which the open space (48) is sealed to prevent communication between the chamber (46) and the inner tube (34) interior thereby preventing entry of material into the chamber (46).

17 Claims, 3 Drawing Sheets

SIZER APPARATUS HAVING SHIFTABLE HORN

BACKGROUND OF THE INVENTION

1. Field of the Invention

The present invention concerns a sizer for stuffing flowable materials such as sausage into a flexible casing. More particularly, the invention concerns a horn assembly having inner and outer concentric tubes presenting an evacuation chamber therebetween connected to a vacuum source. The tubes are shiftable relative to one another between an open position in which the chamber communicates with the interior of the inner tube through an open space adjacent the discharge ends of the tubes for evacuating air from material within the inner tube, and a closed position in which the open space is sealed to prevent communication between the chamber and the inner tube interior thereby preventing entry of material into the chamber.

2. Description of the Prior Art

When stuffing flowable materials such as sausage and hamburger into a casing, residual air pockets can result in voids in the finished product and holes in the sliced product. Prior art devices and techniques attempt to keep the flowable materials under vacuum during processing and stuffing in order to remove excess air much as that shown in U.S. Pat. No. 5,035,671, the disclosure of which is hereby incorporated by reference. In so doing, however, the flowable material has a tendency to enter the vacuum passages which can plug the passages and create sanitation problems. Accordingly, the prior art points out the need for a sizer which removes air from the flowable product being stuffed without plugging vacuum lines and attendant sanitation problems

SUMMARY OF THE INVENTION

The present invention overcomes the problems discussed above and provides a distinct advance in the state of the art. That is to say, the preferred sizer and horn assembly hereof effectively removes air from flowable material and the casing into which it is being stuffed without plugging the vacuum passages used to remove the air.

Broadly speaking, the preferred sizer includes a horn assembly, an inlet structure for delivering flowable material to the assembly, and an actuatable piston for ejecting a charge of flowable material through the horn assembly and into the product casing. The preferred horn assembly includes inner and outer, concentric tubes longitudinally shiftable relative to one another and presenting an evacuation chamber therebetween, a shifting mechanism for selectively shifting the tubes between open and closed positions, and sealing structure for sealing an open space between the chamber and the inner tube interior. In the open position, the chamber communicates with the interior of the inner tube through the open space adjacent the discharge ends of the tubes, and in the closed position the tubes are shifted to seal this open space and thereby prevent communication.

In preferred forms, a selectively activatable air cylinder is coupled with the inner tube for shifting thereof relative to the outer tube. The discharge ends of the inner and outer tubes are configured to mate with one another in a sealing relationship when the inner tube is shifted to the closed position. Other preferred aspects of the invention are disclosed herein.

DETAILED DESCRIPTION OF THE PREFERRED EMBODIMENT

Figure 1:
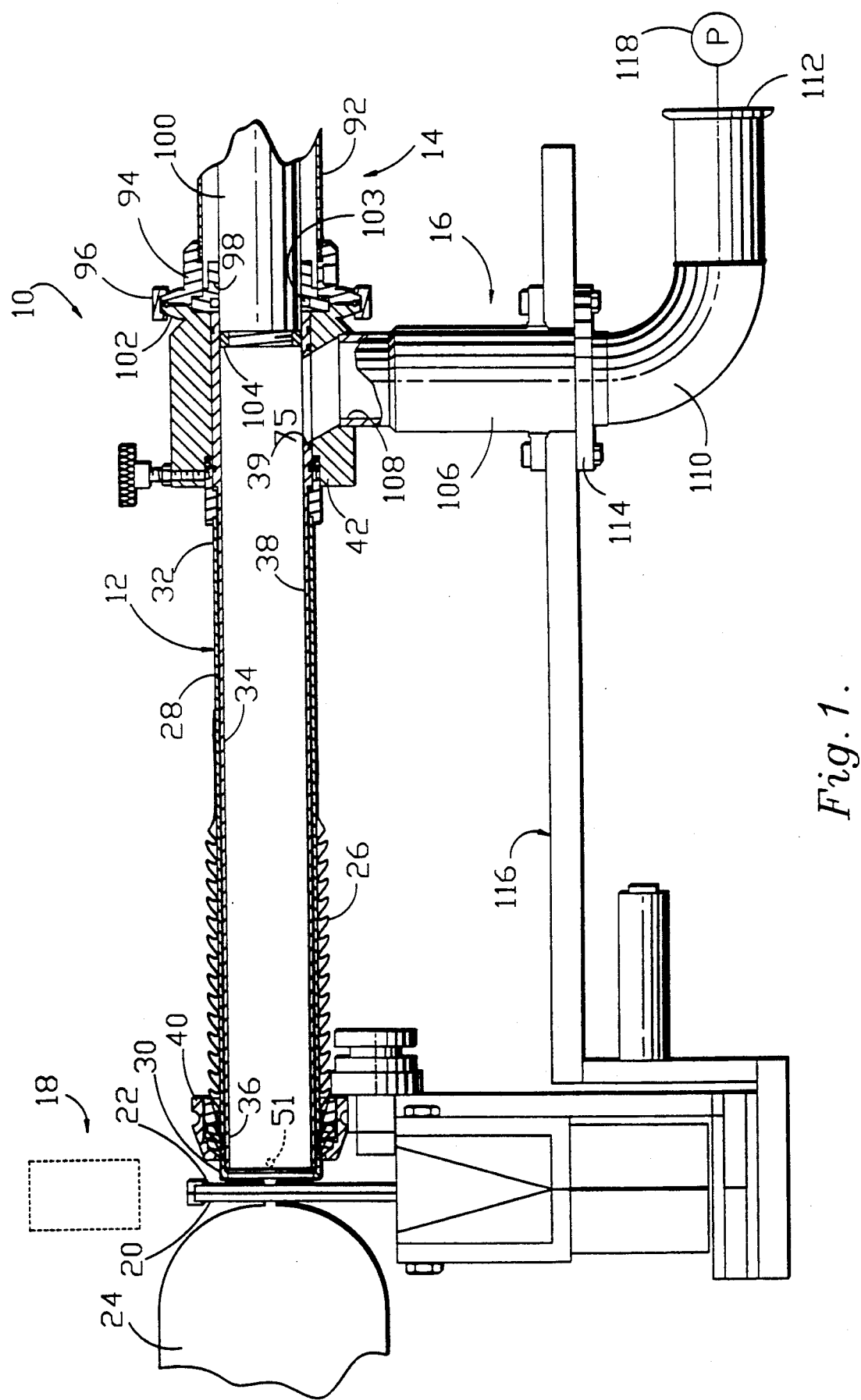
FIG. 1 is a partial side elevational view of the preferred sizer in partial section.
Figure 2:
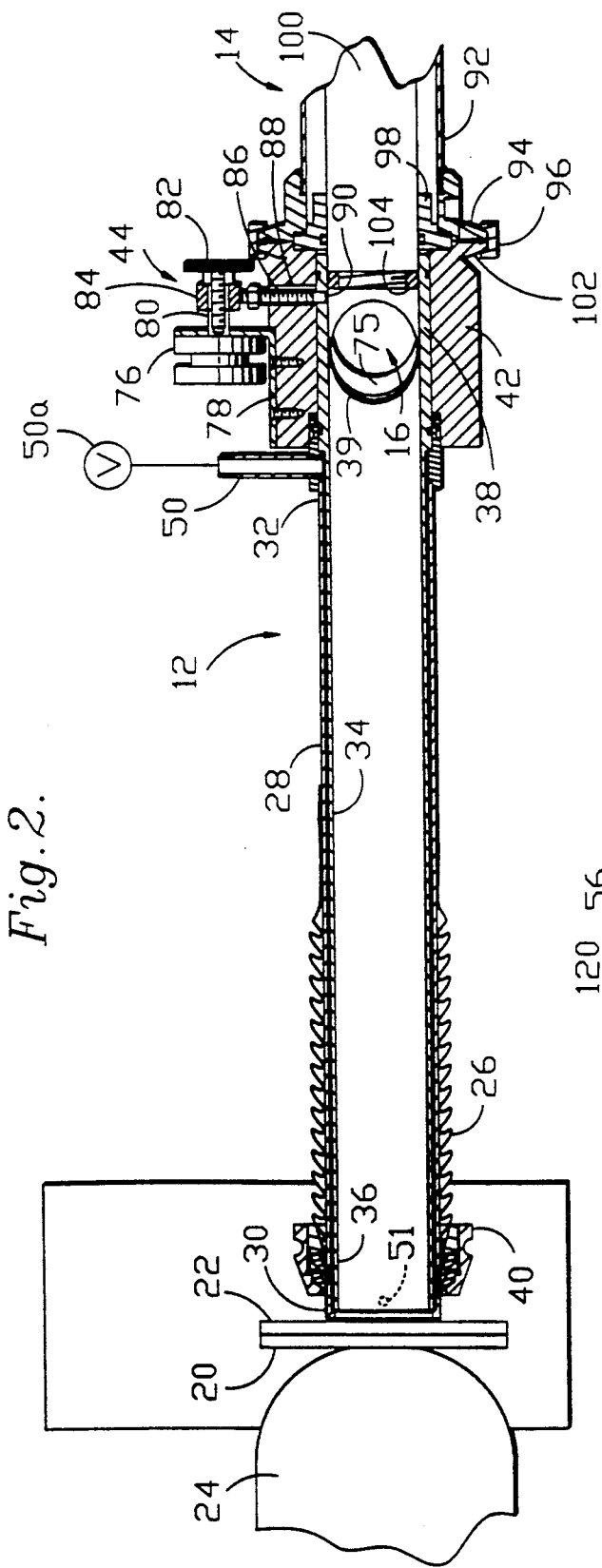
FIG. 2 is a partial plan sectional view of the sizer in FIG. 1.

Turning now to the drawing figures and in particular FIGS. 1 and 2, sizer 10 broadly includes horn assembly 12, piston assembly 14 and inlet structure 16. As illustrated, sizer 10 is shown in use with conventional clipping mechanism 18 such as that known as TIPPER TIE Model No. 24242; a pair of separable voider jaws 20 and 22 are positioned immediately below the clipping mechanism 18. A portion of stuffed casing 24 is shown, and an empty casing 26 is positioned over horn assembly 12.

Figure 3:
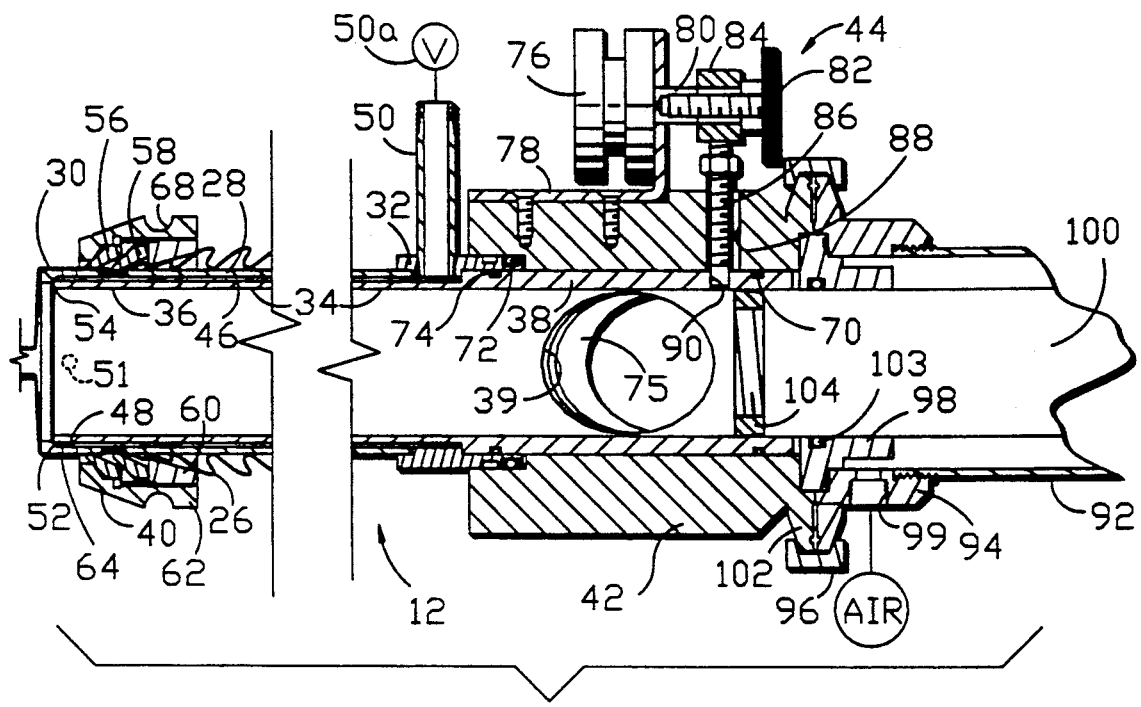
FIG. 3 is a partial plan sectional view of the preferred horn assembly of the sizer showing the inner tube in a closed position.
Figure 4:
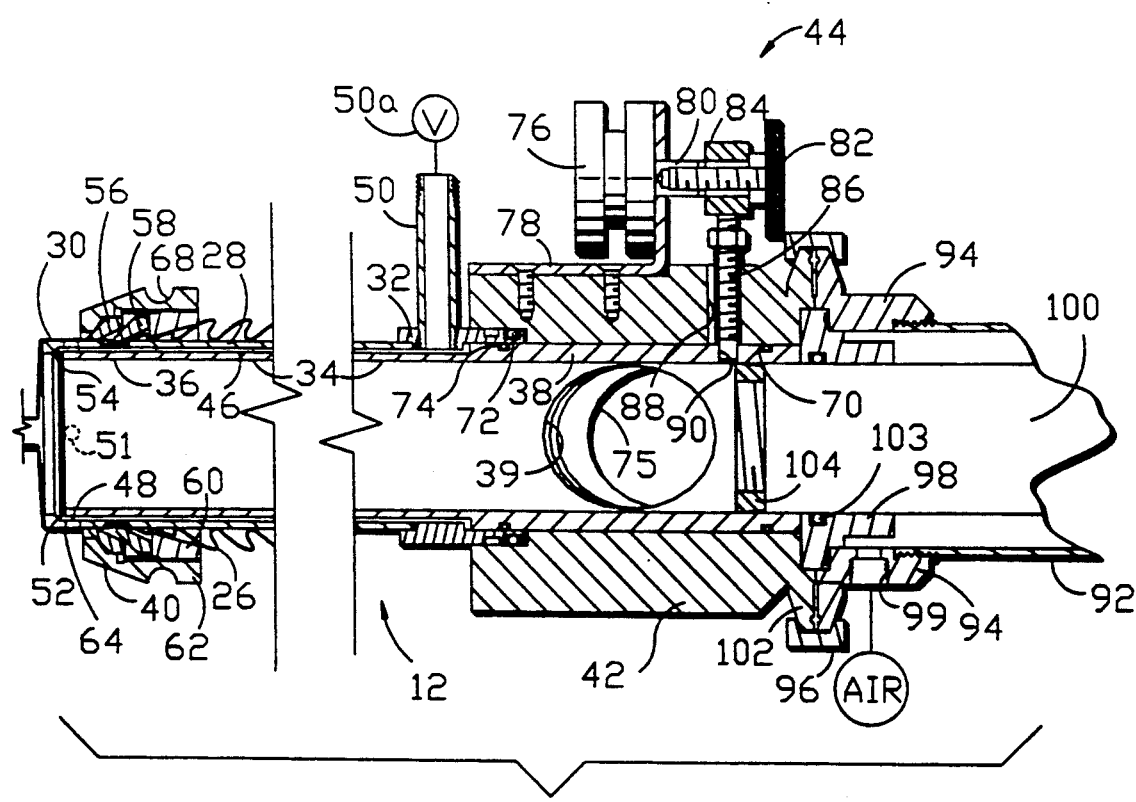
FIG. 4 is a view of the horn assembly of FIG. 3 showing the inner tube in the open position.

Referring to FIGS. 3 and 4, horn assembly 12 includes outer tube 28 having outlet end 30 and inlet end 32, shiftable inner tube 34 having discharge end 36 and input end 38 with inlet opening 39 adjacent thereto, casing tension ring 40, housing 42 and shifting mechanism 44.

Inner tube 34 is coaxially positioned within outer tube 28 and is longitudinally shiftable relative thereto between a closed position as illustrated in FIG. 3 and an open position as illustrated in FIG. 4. Tubes 28, 34 are dimensioned to present evacuation chamber 46 therebetween which communicates with the interior of inner tube 34 by way of open space 48 which is that space created at discharge end 36 of inner tube 34 when in the open position as illustrated in FIG. 4. Vacuum pipe 50 is coupled with and extends through outer tube 28 to allow connection of a conventional source of vacuum 50a to chamber 46. Outer tube 28 also includes casing evacuation port 51 defined therethrough adjacent outlet end 30.

Discharge end 36 of inner tube 34 presents beveled edge 52 configured to mate with sealing seat 54 defined on the interior surface of outer tube 28 adjacent outlet end 30. Edge 52 and seat 54 together form means for sealing open space 48 therebetween when inner tube 34 is shifted to the closed, that is to say, sealed position illustrated in FIG. 3. When sealed, communication is prevented between evacuation chamber 46 and the interior of inner tube 34. In this way, meat product is prevented from entering chamber 46 during flow through horn assembly 12.

Casing tension ring 40 includes forward and rearward, wedge-shaped in cross-section, tension members 56 and 58, stop ring 60, and support body 62. An empty, accordion folded casing 26 is disposed between tension ring 40 and the outer surface of outer tube 28 which also presents raised surface 64 adjacent outlet end 30 as illustrated in FIGS. 3 and 4. Tension ring 40 is positioned so that the leading edge of forward tension member 56 engages casing 26 against raised surface 64. The leading edge of rearward tension member 58 engages casing 26 behind raised surface 64. Stop ring 60 prevents rearward movement of tension members 56 and 58, and support body 62 is configured to hold members 56, 58 and ring 60 in their relative positions as illustrated in the drawing figures. The periphery of support body 62 presents annular groove 68 which is configured for receiving a tightening band (not shown) which can be adjusted to vary the compression on body 62 and thereby the tension exerted by members 56 and 58 on casing 26.

Housing 42 presents a tubular configuration machined to receive the rearward portion of inner tube 34 in a manner allowing longitudinal movement therewithin. O-ring 70 seals the rearward portion of tube 34 with the inner surface of housing 42.

The rearward portion of outer tube 28 is configured to fit around inner tube 24 and to fit partially within housing 42 and between it and inner tube 34. O-ring 72 provides a seal between housing 42 and the rearward portion of outer tube 28. Similarly, O-ring 74 provides a seal between the rearward portions of both outer and inner tubes 28 and 34. Housing 42 also includes material passage 75 defined therethrough and aligned with inlet opening 39 of inlet tube 34 and with inlet structure 16.

Shifting mechanism 44 provides the motive force for shifting inner tube 34 between its open and closed positions. Mechanism 44 includes double-acting, air operated cylinder 76 mounted to housing 42 by bracket 78 with operating piston 80 extending from cylinder 76 through bracket 78, knurled thumb bolt 82 securing actuator block 84 to piston rod 80, and threaded operating rod 86 having one end received within block 84 and extending through housing opening 88 into operating hole 90 defined through the wall of inner tube 34 near input end 38 thereof. As shown in the plan view of FIGS. 3 and 4, air actuation of cylinder 76 receives operating air from an appropriate source thereof and shifts piston 80 left and right which in turn shifts operating rod 86 within opening 88 to shift inner tube 34 between its open and closed positions.

FIGS. 1-4 illustrate the forward portion of conventional piston assembly 14 which is operable to eject charges of flowable material from horn assembly 12. Piston assembly 14 includes piston housing 92, coupling flange 94, flange clamp 96, piston alignment block 98 and piston 100. The forward end of piston housing 92 is threadably secured to the rearward end of coupling flange 94.

Flange 94 mates with housing flange 102 integrally defined as part of housing 42 at the rearward edge thereof and is secured thereto by clamp 96. Tubularly shaped alignment block 98 fits within flange 94 and partially within housing 42 as best viewed in FIGS. 3 and 4. The interior surface of the alignment block 98 is flush and aligned with the interior surface with inner tube 34 to provide smooth surface for movement of piston 100. Flange 94 also includes air-connection opening 99 for connection with a conventional source of compressed, plant air which is used to shift piston 100 rightwardly as viewed in FIGS. 3 and 4.

O-ring 103 provides a seal between the outer surface piston 100 and the inner surface of alignment block 98. Piston 100 includes annulus 104 integral with the forward surface thereof which operates to shear material particles flush with inlet opening 39.

Referring now to FIG. 1, inlet structure 16 includes upper straight pipe 106 presenting material outlet 108 received within and supported by housing 42 for discharge of material through housing passage 75 and inlet opening 39, lower curved pipe 110 presenting material inlet 112, rotatable coupler 114 interconnecting pipes 106 and 110, and mounting plate 116 connected to coupler 114.

Material inlet 112 preferably receives material from a source capable of providing defined charges of the material to be stuffed. The preferred source is a dual piston pump 118 of the type commercialized by Marlen Research Corporation of Overland Park, Kansas, as described in U.S. Pat. Nos. 4,097,962, 3,456,285 and 4,869,655.

The assembly 12 is rotated away from clipper mechanism 18 by grasping the horn assembly 12 and rotating it about the axis joint of pipes 106, 110. This allows placement of a new casing on horn assembly 12, whereupon it is rotated back into operating position with regard to mechanism 18.

Figure 5:
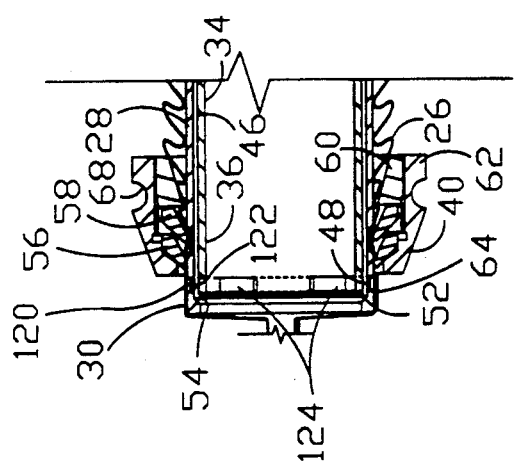
FIG. 5 is a fragmentary view illustrating the end of a shiftable horn assembly having modified evacuation port structure.

Referring to FIG. 5, a modified horn assembly is depicted. The assembly of that figure is in most respects identical to that previously described, but has altered evacuation port structure. Specifically, the outer tube 28 is provided with a continuous circumferential groove 120 presenting a bottom wall 122. A total of four radially spaced slots 124 are provided through the groove bottom wall 122. It has been found that a groove arrangement of this type is sometimes preferable to the use of ports 51 described previously. In particular, it sometimes occurs that a folded casing section may bridge the ports 51, and diminish the ability to effectively evacuate the region between the inner and outer tubes. However, use of a groove 120 and slots 124 effectively eliminates this problem.

Operation

To begin operation, horn assembly 12 is rotated away from clipper mechanism 18. With casing tension ring 40 removed, empty casing 26 is placed over horn assembly 12 in the conventional manner. More specifically, empty casing 26 is placed over outer tube 28. With a portion of the casing drawn forward, the horn assembly 12 is rotated back into its stuffing position, and tension ring 40 is replaced in the position illustrated in the drawn figures. The leading edge of casing 26 is drawn through voider jaws 20 and 22. Clipper mechanism 18 is then activated to provide the initial clip at the forward end of casing 26.

Air pressure is then applied through air connection opening 99 to cause piston 100 to retract to its rearmost position as illustrated in the drawing figures. Initially, shifting mechanism 44 shifts inner tube 34 to its closed position. Vacuum is then applied to evacuation chamber 46 through vacuum pipe 50.

Shifting mechanism 44 is then activated to shift inner tube 34 to its open position which allows vacuum to be applied from chamber 46 through open space 48 to the interior of inner tube 34. The presence of vacuum in chamber 46 is also communicated through casing evacuation port 51 (or slots 124 in the case of the FIG. 5 embodiment) defined through the wall of outer tube 28. This withdraws any air trapped between casing 26 and outer tube 28. The shifting of inner tube 34 does not affect evacuation port 51 (or slots 124), and in this way, air is continuously removed from between casing 26 and outer tube 28.

Mechanism 44 next shifts inner tube 34 to its closed position and material pump 118 provides a charge of material through inlet structure 16 into inner tube 34. When this is complete, piston 100 moves forwardly (leftwardly in FIGS. 3 and 4), to push product forward for discharge through the end of horn assembly 12, into casing 26, and through voider jaws 20 and 22. As piston 100 moves across inlet opening 39, annulus 104 shears the material to provide a clean cut-off.

When the charge of product has fully entered casing 26 and passed beyond jaws 20, 22, the latter then close, and piston 100 then reverses direction and shifts to its initial position behind inlet opening 39. This action withdraws product from the vicinity of outlet end 30 and discharge end 36 and away from the seal between the two.

Mechanism 44 then shifts inner tube 34 to its open position allowing communication through open space 48 between chamber 46 and the interior of inner tube 34. Since product has been withdrawn from the vicinity of open space 48 by the action of piston 100, material cannot be drawn into chamber 46 when inner tube 34 shifts to the open position.

The application of vacuum to the interior of inner tube 34 also applies vacuum to the casing "tail" or "rope" extending rearwardly from the filled casing, and deaerates product remaining within horn assembly 12. While the vacuum is maintained, clipper mechanism 18 applies a second clip to the filled casing, applies the next clip for the next casing portion to be filled, and cuts the casing between the two clips. The filled casing is then ejected and jaws 20, 22 first open and then return to their initial positions. The cycle is then repeated for the next stuff of material.

As those skilled in the art will appreciate, the present invention provides greatly enhanced deaeration of stuffing material, of the casing itself, and of the casing tail. At the same time, the present invention avoids the additional problems of the prior art in which material enters the vacuum passages.

Having thus described the preferred embodiment of the present invention, the following is claimed as new and desired to be secured by Letters Patent:

1. A horn assembly adapted for coupling to a source of flowable material and to receive a flexible casing thereover permitting the casing to be filled with said material, said horn assembly comprising:
    an elongated, outer tube presenting an inlet end and an outlet end;
    an elongated, inner tube presenting an inlet end and an outlet end and situated within said outer tube and defining with the latter an open area between the outer and inner tubes;
    shifting means operably coupled with at least one of said outer and inner tubes for selective, relative axial movement between the tubes such that the tubes can assume alternate first and second relatively shifted positions;
    sealing means for sealing said open area between said tubes when the tubes assume said first shifted position, and for permitting communication between said open area and the interior of said inner tube when the tubes assume said second shifted position; and
    means in operative communication with said open area between said tubes for selective withdrawal of air therefrom when said tubes assume said second shifted position.

2. The horn assembly of claim 1, wherein said inner tube is substantially concentrically disposed relative to said outer tube.

3. The horn assembly of claim 1, said outer tube being stationary, said shifting means being coupled with said inner tube for selective, relatively axially movement of the inner tube relative to the outer tube.

4. The horn assembly of claim 1, said sealing means comprising an annular seal adjacent the outlet end of said outer tube and engageable with said outlet end of said inner tube.

5. The horn assembly of claim 1, said shifting means comprising a pneumatic piston and cylinder assembly having a shiftable piston rod, and means operably coupling said rod with at least one of said outer and inner tubes.

6. The horn assembly of claim including structure defining a flowable material inlet adjacent the inlet end of said inner tube and communicating with the interior of the latter.

7. The horn assembly of claim 1, said air withdrawal means comprising an air-conveying tube in communication with said open area and adapted for coupling with a vacuum pump.

8. The horn assembly of claim including means positioned about said outer tube proximal to the output end thereof for gripping a casing applied over the horn assembly during filling of the casing.

9. The horn assembly of claim 1, said outer tube including an evacuation port structure defined therethrough for evacuating air from between said outer tube and a casing placed thereover.

10. The horn assembly of claim 9, there being a groove in the outer surface of said outer tube and presenting a bottom wall, said evacuation port structure including at least one slot through said groove bottom wall.

11. Sizing apparatus for handling a flowable material and discharging the same as discrete portions, said apparatus comprising:
    a horn assembly including
        an elongated, outer tube presenting an inlet end and an outlet end;
        an elongated, inner tube presenting an inlet end and an outlet end and situated within said outer tube and defining with the latter an open area between the outer and inner tubes;
    shifting means operably coupled with at least one of said outer and inner tubes for selective, relative axial movement between the tubes such that the tubes can assume alternate first and second relatively shifted positions;
    sealing means for sealing said open area between said tubes when the tubes assume said first shifted position, and for permitting communication between said open area and the interior of said inner tube when the tubes assume said second shifted position; and
    means in operative communication with said open area between said tubes for selective withdrawal of air therefrom when said tubes assume said second shifted position;
    inlet structure in communication with said inner tube and adapted for coupling with a material pump for delivery of said flowable material to the interior of said inner tube;
    a selective actuatable piston situated adjacent the input ends of said outer and inner tubes and operable for selective forward movement thereof from an initial position rearward of said inlet structure and into the confines of said inner tube for ejecting a charge of flowable material out said outlet end of the inner tube and into said casing for filling of the latter, and for rearward movement thereof back to said initial position.

12. The sizing apparatus of claim 11, wherein said inner tube is substantially concentrically relative to said outer tube.

13. The sizing apparatus of claim 11, said outer tube being stationary, said shifting means being coupled with said inner tube for selective, relatively axially movement of the inner tube relative to the outer tube.

14. The sizing apparatus of claim 11, said sealing means comprising an annular seal adjacent the outlet end of said outer tube and engageable with said outlet end of said inner tube.

15. The sizing apparatus of claim said shifting means comprising a pneumatic piston and cylinder assembly having a shiftable piston rod, and means operably coupling said rod with at least one of said outer and inner tubes.

16. The sizing apparatus of claim 11, said air withdrawal means comprising an air-conveying tube in communication with said open area and adapted for coupling with a vacuum pump.

17. The sizing apparatus of claim 11, including means positioned about said outer tube proximal to the output end thereof for gripping a casing applied over the horn assembly during filling of the casing.

* * * * *